United States Patent [19]
Littell

[11] Patent Number: 5,297,605
[45] Date of Patent: Mar. 29, 1994

[54] FOLDABLE TIRE CHAIN ATTACHING AID

[76] Inventor: Gary T. Littell, 6923 Burnet Ave., Van Nuys, Calif. 91405

[21] Appl. No.: 964,062

[22] Filed: Oct. 21, 1992

[51] Int. Cl.⁵ .............................................. B25B 27/22
[52] U.S. Cl. ................................ 152/213 R; 81/15.8; 254/88
[58] Field of Search ..................... 152/213 R; 81/15.8; 254/88

[56] References Cited

U.S. PATENT DOCUMENTS

| | | | |
|---|---|---|---|
| 1,189,632 | 7/1916 | Seitz | 152/213 R |
| 3,893,500 | 7/1975 | Planz | 152/213 R |
| 3,937,263 | 2/1976 | Hill et al. | 152/213 R |
| 4,031,939 | 6/1977 | De Martini | 152/213 R |
| 4,103,870 | 8/1978 | Murakami | 152/213 R X |
| 4,487,314 | 12/1984 | Stewart | 152/213 R X |

Primary Examiner—Michael W. Ball
Assistant Examiner—Francis J. Lorin
Attorney, Agent, or Firm—John P. Halvonik

[57] ABSTRACT

The invention is a sloped apparatus for holding auto tires for the placement of chains around the tires. The apparatus has a pair of sloped surfaces each of which has a notch running across its width. At the top of the apparatus is a cup shaped surface for holding the tire once the auto is driven onto the sloped surfaces. Guides in connection with the sloped surfaces on either side fold back onto the device when not in use and provide for folding up of the apparatus when not in use. The underside of the apparatus contains storage compartments for the tire chain when not in use.

3 Claims, 3 Drawing Sheets

FOLDABLE TIRE CHAIN ATTACHING AID

FIELD OF INVENTION

1. Background of the Invention

The invention relates to the field of tire chains and in particular to a sloped, ramp apparatus which secures the tire chain in order for the car to drive up for easy placement of the chain around the tire.

2. Description of the Prior Art

While there are apparatus which aid in the placement of tire chains around the tires of the auto, none that applicant is aware of have non-skid slopes to prevent the movement of the tire or fold up for easy storage of the tire chain.

SUMMARY OF THE INVENTION

The invention is a securing device, for holding a tire chain upon the upper surfaces of the device in order to place the tire chain around the tire of the auto with little effort. Each side of the device has a pair of sloped upper surfaces with a notched surface in between the sloped ones. The notched surface holds a portion of the chain in place for the tire. A cupped surface at the top of the device secures the tire for placement of the chain. The front guides of the device fold against the sloped sides for easy storage and transport. A connecting wall in the center aids in strengthening the device.

It is an object of the invention to provide a securing device for placing a tire chain onto auto tires.

Another object of the invention is to provide a sloped ramp and cradle with non skid surfaces to maintain a tire chain in position for a tire.

Yet another objective is to provide a sloped ramp device for placement of tire chains that can be folded for storage and transport.

Other objectives of the invention will become apparent to those skilled in the art once the the invention has been shown and described.

DESCRIPTION OF THE PREFERRED EMBODIMENT

Figure 1:
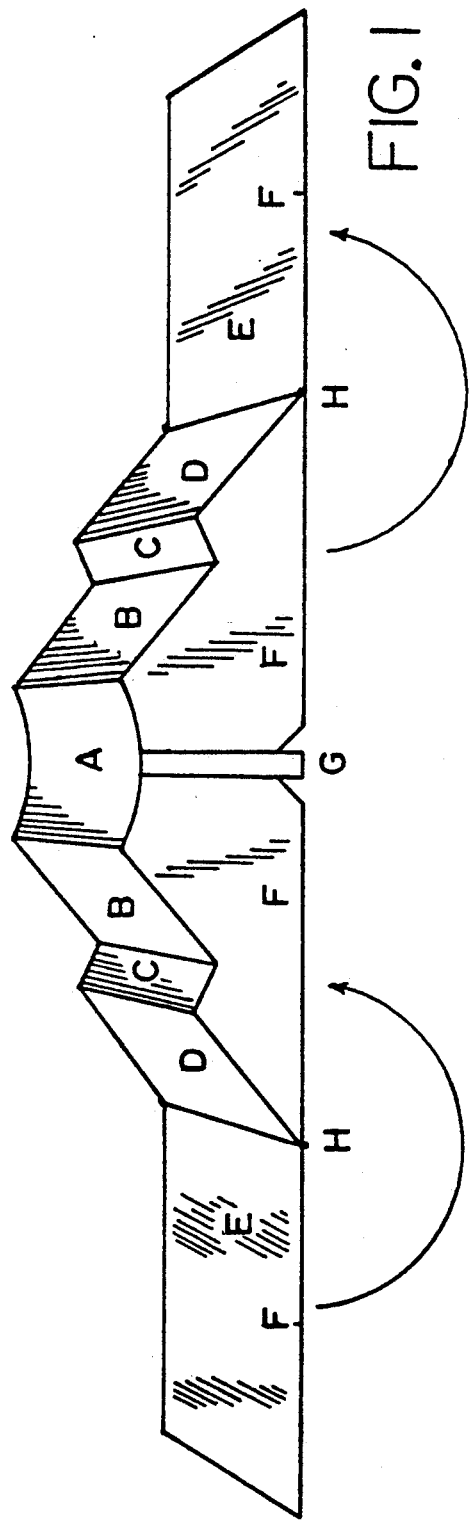
FIG. 1 Shows the overall construction of the apparatus
FIG. 2 Side view
FIG. 3 Apparatus with tire chain in place
FIG. 4 Underside for storage
FIG. 5 Underside folded up

The overall construction of the apparatus is as shown in FIG. 1. The ramp is essentially symmetrical about the center with each side having two sloped upper surfaces and a notched surface C intermediate of the sloped surfaces. The surface above tee notch is designated B and the bottom surface, below the notch is designated D. Both surfaces B and D are of roughly the same slope with a slope angle of about 45° being preferred.

The notched surface C runs across the width of the sloping surfaces. It is intended to hold the chain before it is placed around the tire. It should be about ¾-1" in depth that is, below the cupped surface.

At the top of the apparatus is the cup shaped surface A which is designed to conform to the shape of a tire that will rest there when the auto is driven onto the ramp. The tire will rest in the cup shape so that the chains which are resting in the notches C, may be placed around the tire with ease.

The guides (or lids) E are in folding connection with each of the lower sloped surfaces D. The guides are essentially flat and may have raised edges. The guides may also fold back against the underside of the apparatus to act as lids for the underside storage compartments. This provides for ease of transport.

Figure 6:
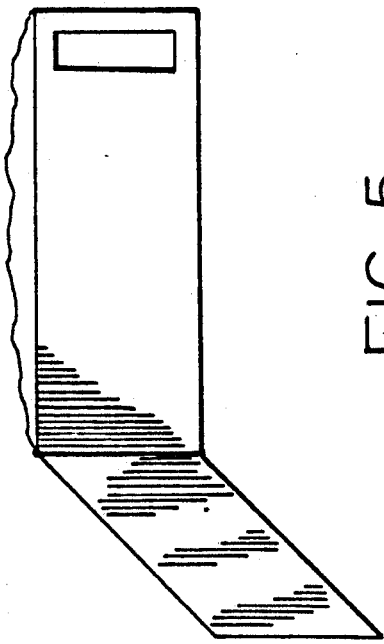
Figure 4:
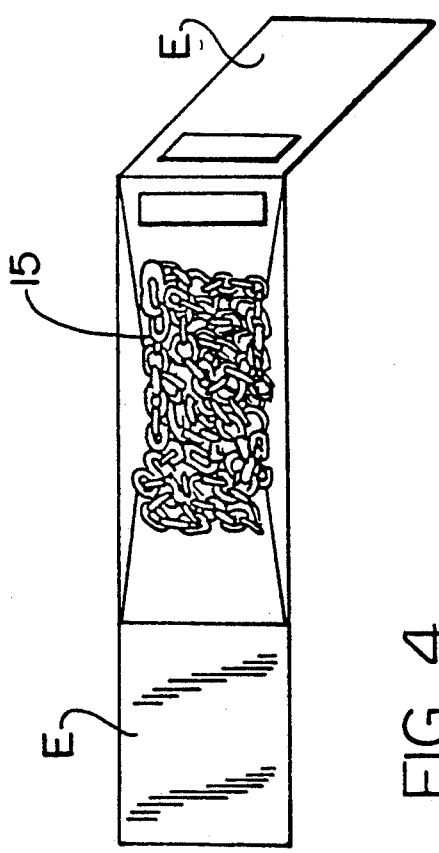
Figure 5:
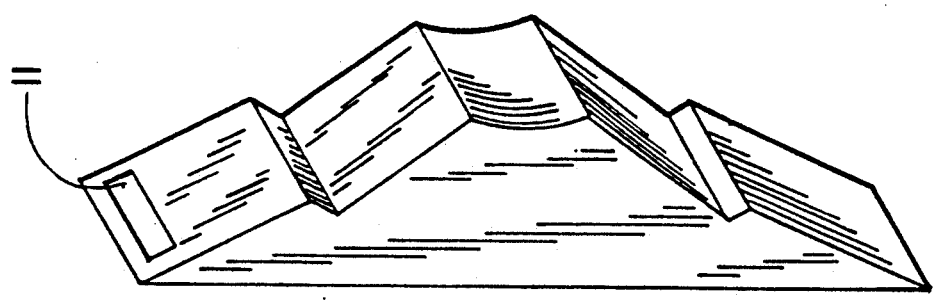

Beneath the cup shaped surface is a connecting wall G running the height of the apparatus and dividing the area on the underside of the sloping sides into two storage areas, one on either side of the connecting wall. This area may be used to store the tire chains when not in use. FIG. 4 shows the underside of the apparatus when used for storage and FIG. 5 shows the underside with one lid E folded over for transport. FIG. 6 shows the folded device in position for carrying by hand.

All of the surfaces A, B, C, D, and E should be covered with an anti-skid material having a roughened, anti-skid texture. The surfaces should provide a frictional surface for the tire of the auto (or truck, etc.) in order to facilitate its moving up the ramp. This layer is shown as 12.

Figure 2:
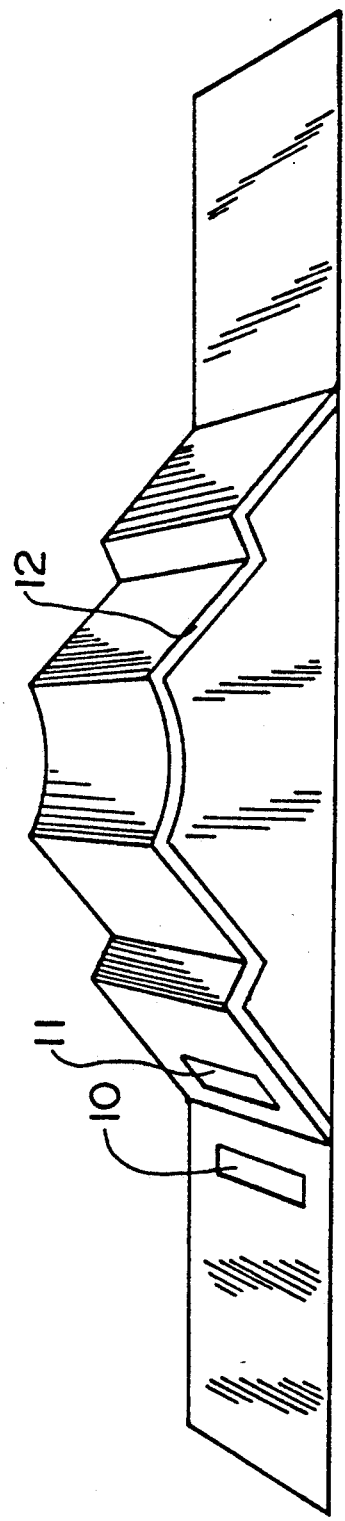
Figure 3:
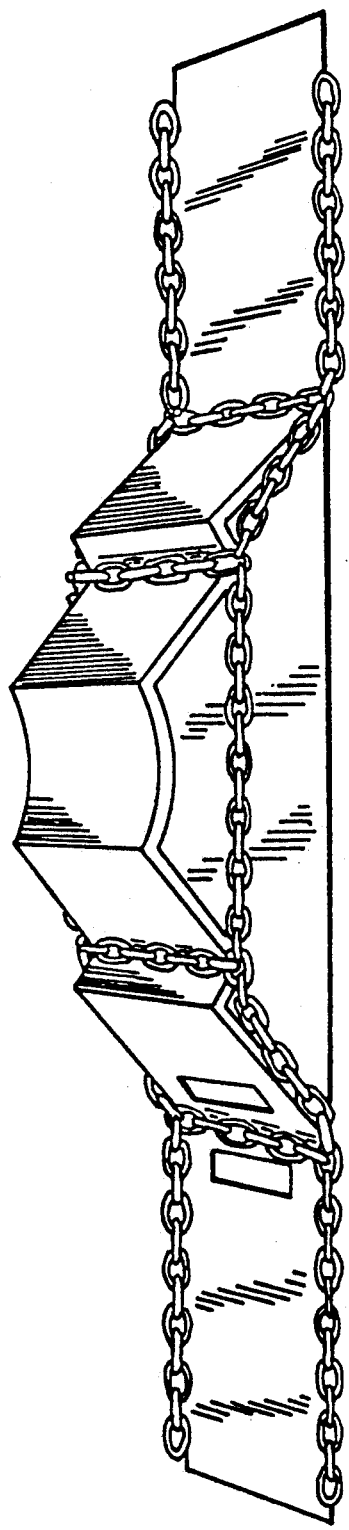

One of the lids E and one of the slopes D each have a hand hold aperture 10 and 11 for carrying the apparatus when it is folded up for storage. The apertures should be on the same side of the apparatus as shown in FIG. 2 and 3 so that when one folds down the lid E it will be adjacent to the aperture in the slope D, i.e. one is able to place his hand in both apertures in order to carry the device.

To use the device, a tire chain is placed across the width of the sloping sides in the notch C as shown. The car (truck, etc.) is driven up the sloping surfaces D and B until it comes to rest in the cup shaped surface. With the tire in place, the chain may then be connected around the tire. It is in a good position because the notched surface is below that of the tire and it is a simple matter to bring the chain over the tire and secure it into place.

The preferred dimensions of the apparatus would be about 15½" long by about 8" wide and about 3½" high. The preferred material to construct the apparatus would be a hardened thermoplastic material with a molded, rough, non-skid surface.

The two bottom guides which serve as closure doors for the underside storage compartments may be latched together with any state of the art means for joining such doors together.

I claim:

1. A support apparatus for holding tire chains for placement around tires comprising: first and second half sections, each of said sections having left and right side walls, and having an upper wall connecting said left and right walls, each of said upper walls having a curved surface and a sloped surface wherein a cup-shaped surface is formed where said upper walls meet, each of said sloped surfaces having a notched portion running across the width of the apparatus so as to divide each sloped surface into top and bottom slopes, each of said bottom slopes having a bottom edge, left and right guide means in pivotal connection with each said section along a line running widthwise along said bottom edge of each of said section, and a layer of frictional material overlying each of said upper surfaces and also overlying said cup shaped portion, whereby the guide means can be folded underneath the apparatus in order to enclose a space defined by the side walls and the upper walls.

2. The apparatus of claim 1 having a connecting wall in connection with each of said left and right side walls so as to divide said apparatus into two storage spaces which may be covered by said guide means.

3. The apparatus of claim 2 having at least one hand hold means in said guide means.

* * * * *